Aug. 20, 1957    K. A. McLEOD    2,803,798
PORTABLE MAGNETOMETER
Filed March 20, 1945
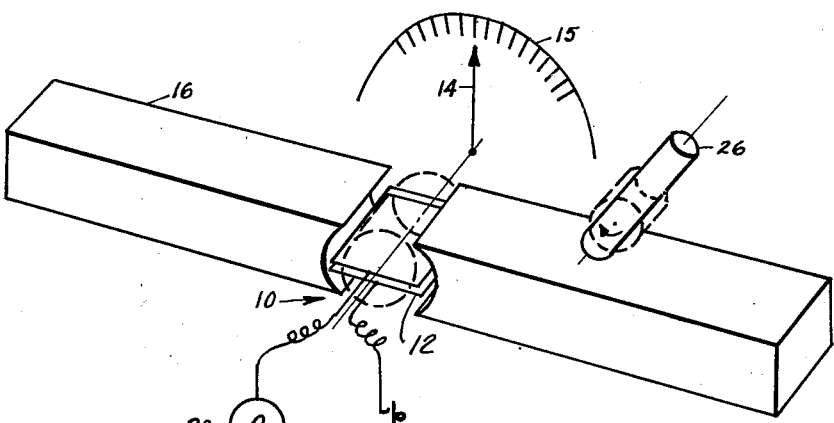
Fig. 2
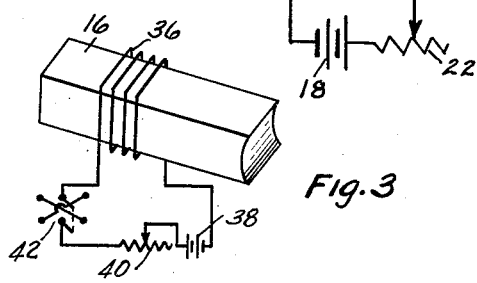
Fig. 3
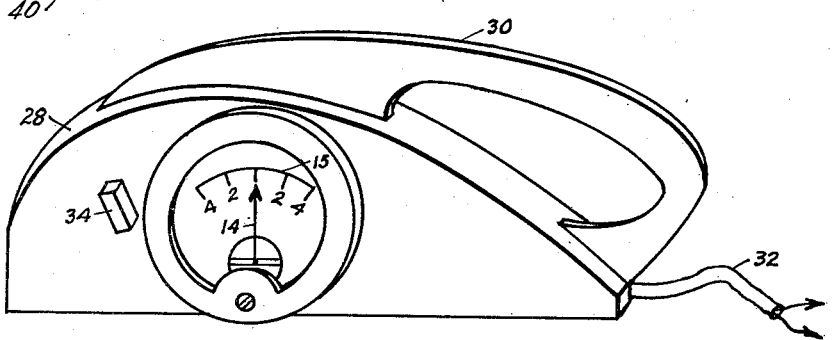
Fig. I
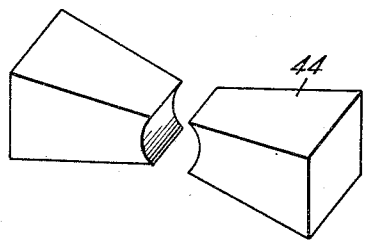
Fig. 4
Inventor
Kenneth A. McLeod
By P. E. Bush
Attorney

United States Patent Office 2,803,798
Patented Aug. 20, 1957

2,803,798
PORTABLE MAGNETOMETER

Kenneth A. McLeod, West Caldwell, N. J., assignor to the United States of America as represented by the Secretary of the Navy Application March 20, 1945, Serial No. 583,747

3 Claims. (Cl. 324—43)

This invention relates to magnetometers.

The object is to provide a portable, rugged and low-sensitivity instrument for measuring magnetic fields, and more broadly to produce an improved magnetometer.

Accordingly, a D'Arsonval milliammeter movement is associated with a dipole magnetic antenna of high permeability, and a predetermined, constant, direct current is passed through the meter coil. Means are provided for bucking the component of the earth's magnetic field in said dipole. The magnetometer may then be moved toward the local magnetic anomaly to be detected or measured, avoiding rotation of the dipole about a transverse axis. The instrument may be calibrated or it may be used simply as an indicator for magnetic anomalies. The same instrument can be used as a pitch-roll indicator in aircraft and the like by so orienting it in the craft that the dipole will move through an arc about an axis transverse of the dipole. By providing the dipole with arcuate sections which may partially or entirely encircle a high-current conductor, it may be used as a direct-current ammeter. Further uses and applications will suggest themselves generally to those skilled in the art.

In the drawings:

Fig. 1 is an external perspective view of a preferred form of the magnetometer omitting the current supplying means;

Fig. 2 is a schematic representation of the structure and the electrical circuit of the same form of magnetometer;

Fig. 3 is a modification of the invention having an electromagnet for bucking the local component of the earth's magnetic field; and Fig. 4 shows a further modification of the invention wherein the dipole is of hour-glass shape.

In Fig. 2, D'Arsonval movement generally indicated by numeral 10 comprises a current coil 12 and the usual springs, bearings and adjustments (not shown). The pointer 14 is normally set at the center of scale 15 with no current through the coil. Magnetic dipole 16 concentrates magnetic flux in the air gap around coil 12. The direct-current supplying means, such as battery 18, and optionally milliammeter 20 and rheostat 22, supplies a predetermined amount of current to coil 12 when push-button switch 24 is closed. Means is provided for bucking the local component of the earth's magnetic field in dipole 16, which conveniently is a permanent magnet 26 mounted for rotation about an axis parallel to the axis of coil 12. It is obvious that other means can be readily substituted for obtaining the same result, such as by providing a coil encircling a part of the dipole together with adjustable and reversible current supplying means.

Such a construction is shown in Fig. 3; an electromagnetic means is substituted for the permanent magnet means shown in Fig. 2. The electromagnetic means are shown as having a coil 36 encircling a part of the dipole 16. Current for the coil is supplied by the battery 38 through the adjustable resistor 40 and the reversible switch 42.

In Fig. 1, the D'Arsonval movement 10, dipole 16 and permanent magnet 26 are shown enclosed in case 28 having handle 30. Leads 32 are provided for the direct-current supplying means 18, 20 and 22. Push-button 24 is mounted in the back wall of casing 28 (not shown in Fig. 1) in a position to be accessible to the forefinger when handle 30 is grasped in the right hand. A knob 34 is provided for rotating magnet 26.

In operation, the magnetometer dipole is oriented parallel to the field to be explored while it is some distance removed. Push-button 24 is pressed to energize coil 12 and magnet 26 is manually adjusted so as to obtain a zero or center-scale reading. The magnetometer may then be moved axially or laterally of dipole 16 toward the magnetic field to be measured, taking care not to tip it end for end. Such tipping would change the component of the earth's field affecting the dipole. When the instrument is used for flux measurement rather than as a rough indicator of field strength or field strength changes, it must be calibrated and the calibration may be maintained through the use of fresh batteries omitting milliammeter 20 and rheostat 22; or these may be retained to maintain a more accurate calibration.

In one embodiment of the invention, a 0–1 mil. meter with its field magnet removed and replaced with the high-permeability dipole antenna attained 15,000 gammas per large meter division sensitivity with 80 mils through the coil. This current was supplied by means of a pair of 1½-volt dry cells. The dipole antenna was made of laminated permalloy and was about seven inches in overall length. Sensitivity of the instrument may be increased by increasing the current through the coil within limits and may be further increased if desired by using various lengths and shapes of magnetic antennae, such as an hour-glass shaped dipole 44 shown in Fig. 4 with the meter coil at its midpoint. Numerous additional modifications and details will readily occur to those skilled in the art.

What is claimed is:

1. A portable magnetometer comprising a pivotally supported current coil, a highly permeable magnetic dipole in alignment with and extending oppositely from said coil transversely of the axis thereof, means for supplying a constant direct current to said coil, adjustable means for producing a magnetic field in said dipole for balancing the ordinary component of the earth's field and a switch for controlling said direct current.

2. In a flux meter, a pivotally supported current coil, a highly permeable magnetic dipole aligned with and extending oppositely from said coil transversely of the axis thereof, means supplying a constant direct current to said coil, and adjustable means producing a magnetic field in said dipole for balancing the ordinary component of the earth's field.

3. A portable magnetometer comprising a pivotally supported current coil, a highly permeable magnetic dipole in alignment with and extending oppositely from said coil transversely of the axis thereof, means supplying a constant direct current to said coil, a permanent magnet mounted for rotation about an axis parallel to the coil and producing a magnetic field in said dipole for balancing the ordinary component of the earth's field.

References Cited in the file of this patent

UNITED STATES PATENTS

| | | |
|---|---|---|
| 1,360,326 | Slepian | Nov. 30, 1920 |
| 1,666,309 | Ray | Apr. 17, 1928 |
| 1,863,421 | Tear | June 14, 1932 |
| 1,892,826 | Bettison et al. | Jan. 3, 1933 |
| 1,906,271 | Jakosky | May 2, 1933 |
| 1,951,716 | Varian | Mar. 20, 1934 |
| 2,114,283 | Anderson | Apr. 19, 1938 |
| 2,123,045 | Hoare | July 5, 1938 |
| 2,151,627 | Vacquier | Mar. 21, 1939 |
| 2,338,991 | Arnold | Jan. 11, 1944 |
| 2,370,194 | Riggs | Feb. 27, 1945 |
| 2,493,779 | Rubenstein | Jan. 10, 1950 |

FOREIGN PATENTS

| | | |
|---|---|---|
| 207,680 | Great Britain | Dec. 6, 1923 |